United States Patent
Avati

(10) Patent No.: US 11,836,112 B2
(45) Date of Patent: *Dec. 5, 2023

(54) PATH RESOLVER FOR CLIENT ACCESS TO DISTRIBUTED FILE SYSTEMS

(71) Applicant: Red Hat, Inc., Raleigh, NC (US)

(72) Inventor: Anand Vishweswaran Avati, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 482 days.

This patent is subject to a terminal disclaimer.

(21) Appl. No.: 17/000,851

(22) Filed: Aug. 24, 2020

(65) Prior Publication Data
US 2020/0387480 A1 Dec. 10, 2020

Related U.S. Application Data

(63) Continuation of application No. 14/096,365, filed on Dec. 4, 2013, now Pat. No. 10,754,825.

(60) Provisional application No. 61/871,027, filed on Aug. 28, 2013.

(51) Int. Cl.
*G06F 16/17* (2019.01)
*G06F 16/182* (2019.01)

(52) U.S. Cl.
CPC ........ *G06F 16/1734* (2019.01); *G06F 16/183* (2019.01)

(58) Field of Classification Search
CPC ................. G06F 16/1734; G06F 16/183
USPC ........................................................ 707/827
See application file for complete search history.

(56) References Cited

U.S. PATENT DOCUMENTS

| | | | | |
|---|---|---|---|---|
| 5,388,257 A * | 2/1995 | Bauer | ................ | G06F 16/1794 707/999.001 |
| 6,195,650 B1 * | 2/2001 | Gaither | ................ | G06F 16/192 |
| 6,968,345 B1 * | 11/2005 | Muhlestein | ............ | G06F 16/10 707/827 |
| 7,730,277 B1 * | 6/2010 | Prakash | ................ | G06F 3/0619 718/1 |
| 7,890,529 B1 * | 2/2011 | Srinivasan | ............ | G06F 16/134 707/781 |
| 8,041,735 B1 * | 10/2011 | Lacapra | ............. | G06F 16/1827 707/783 |
| 8,185,684 B1 * | 5/2012 | Naftel | ................ | G06F 9/45558 711/6 |

(Continued)

OTHER PUBLICATIONS

USPTO, Office Action for U.S. Appl. No. 14/096,365, dated Sep. 10, 2015.

(Continued)

*Primary Examiner* — Hosain T Alam
*Assistant Examiner* — Nicholas E Allen
(74) *Attorney, Agent, or Firm* — Lowenstein Sandler LLP

(57) ABSTRACT

Systems and methods implementing a path resolver facilitating client access to a distributed file system. An example method may comprise: receiving, by a processing device, a file identifier comprising a symbolic link; producing, by a user space process being executed by the processing device, a modified file identifier, by replacing a pre-defined sequence of characters within the file identifier by a path to a mount point of a distributed file system; and identifying, in view of the modified file identifier, a data structure comprising information about a file identified by the file identifier.

18 Claims, 3 Drawing Sheets

(56) References Cited

U.S. PATENT DOCUMENTS

| | | | | |
|---|---|---|---|---|
| 8,412,896 | B1* | 4/2013 | Chellappa | G06F 11/1458 707/828 |
| 8,595,237 | B1* | 11/2013 | Chaudhary | G06F 16/14 707/741 |
| 2003/0140051 | A1* | 7/2003 | Fujiwara | H04L 67/1001 |
| 2004/0024786 | A1* | 2/2004 | Anderson | G06F 16/10 |
| 2006/0036570 | A1* | 2/2006 | Schaefer | G06F 9/44505 |
| 2007/0022129 | A1* | 1/2007 | Bahar | G06F 9/5011 |
| 2007/0055703 | A1* | 3/2007 | Zimran | H04L 67/565 |
| 2007/0288693 | A1* | 12/2007 | Rajan | G06F 3/0661 711/114 |
| 2008/0043973 | A1* | 2/2008 | Lai | H04L 61/4505 379/218.01 |
| 2009/0182778 | A1* | 7/2009 | Tormasov | G06F 16/176 |
| 2009/0271418 | A1* | 10/2009 | Vaghani | G06F 16/9017 707/E17.05 |
| 2009/0307241 | A1* | 12/2009 | Schimunek | G06F 16/9014 |
| 2010/0011037 | A1* | 1/2010 | Kazar | G06F 3/0667 707/E17.01 |
| 2010/0030739 | A1* | 2/2010 | Lanjewar | G06F 16/16 707/E17.014 |
| 2010/0114889 | A1* | 5/2010 | Rabii | G06F 16/1824 707/E17.032 |
| 2012/0054490 | A1* | 3/2012 | Rosu | H04W 4/60 713/165 |
| 2012/0066223 | A1* | 3/2012 | Schentrup | G06F 9/4451 707/E17.089 |
| 2012/0102564 | A1* | 4/2012 | Schentrup | H04W 12/02 726/16 |
| 2012/0110018 | A1* | 5/2012 | Jujjuri | G06F 16/13 707/827 |
| 2012/0173655 | A1* | 7/2012 | McEntee | G06F 16/951 709/216 |
| 2012/0284317 | A1* | 11/2012 | Dalton | G06F 16/14 707/827 |
| 2013/0054540 | A1* | 2/2013 | Factor | G06F 16/1752 707/E17.005 |
| 2013/0124400 | A1* | 5/2013 | Hawkett | G06Q 20/22 726/4 |
| 2014/0188791 | A1* | 7/2014 | Hahn | G06F 16/172 707/610 |
| 2015/0067005 | A1* | 3/2015 | Avati | G06F 16/183 707/827 |

OTHER PUBLICATIONS

USPTO, Final Office Action for U.S. Appl. No. 4/096,365, dated Apr. 19, 2016.

USPTO, Office Action for U.S. Appl. No. 14/096,365, dated Oct. 4, 2016.

USPTO, Final Office Action for U.S. Appl. No. 4/096,365, dated May 2, 2017.

USPTO, Office Action for U.S. Appl. No. 14/096,365, dated Oct. 31, 2017.

USPTO, Final Office Action for U.S. Appl. No. 4/096,365, dated Jun. 6, 2018.

USPTO, Final Office Action for U.S. Appl. No. 4/096,365, dated Feb. 7, 2019.

USPTO, Final Office Action for U.S. Appl. No. 4/096,365, dated Sep. 5, 2019.

USPTO, Advisory Action for U.S. Appl. No. 4/096,365, dated Jul. 8, 2016.

USPTO, Advisory Action for U.S. Appl. No. 4/096,365, dated Aug. 3, 2017.

USPTO, Advisory Action for U.S. Appl. No. 4/096,365, dated Sep. 11, 2018.

USPTO, Advisory Action for U.S. Appl. No. 4/096,365, dated Dec. 5, 2019.

USPTO, Notice of Allowance for U.S. Appl. No. 4/096,365, dated Apr. 13, 2020.

* cited by examiner

PATH RESOLVER FOR CLIENT ACCESS TO DISTRIBUTED FILE SYSTEMS

CROSS-REFERENCE TO RELATED APPLICATION

This application is a continuation of U.S. patent application Ser. No. 14/096,365 filed on Dec. 4, 2013, which claims the priority benefit of U.S. Provisional Patent Application No. 61/871,027, filed Aug. 28, 2013. Both above-referenced applications are incorporated by reference herein in their respective entireties.

TECHNICAL FIELD

The present disclosure relates to distributed file systems, and more particularly, to a path resolver for client access to distributed file systems.

BACKGROUND

An operating system usually segregates virtual memory into a kernel space and a user space. The kernel space may be reserved for running privileged kernel, kernel extensions and most device drivers. The user space is the memory area where all user mode applications and some device drivers execute. A file system may also be implemented in the user space. Unix-based file systems typically associate each file and directory with an inode (index node). An inode is a data structure that stores information about a file or directory such as file ownership, access mode (read, write, execute permissions), and file type.

Communications between a user mode application and the file system are typically performed via the kernel. When an application issues a command pertaining to a file or directory stored in the file system (e.g., open, create, delete, etc.), the application usually provides a path to the file or directory, and the kernel's path resolving component ("path resolver") converts the path into an inode address.

Some applications use symbolic links ("symlinks") that point to other files or directories. A symlink is a special type of file that contains a reference to another ("target") file or directory in the form of an absolute or relative path. The kernel's path resolver interprets a text string in the symlink to determine a path to the target file or directory, converts it into an inode address of the target file or directory, and provides the inode to the file system.

The use of the kernel as an intermediary between the application and the file system slows the performance of the application, especially when the application is asking for data or is writing data to a file.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are a method and apparatus implementing a path resolver facilitating client access to a distributed file system. In certain implementations, a distributed file system may be provided by a network attached storage (NAS) system comprising one or more server computer systems each coupled to one or more persistent data storage devices, such as magnetic or optical storage disks, solid-state drives (SSDs), etc. "Computer system" herein shall refer to a system comprising one or more processors, one or more memory devices, and one or more input/output (I/O) interfaces.

A server computer system may execute a file system server daemon to manage file input/output (I/O) requests originated by the file system clients. One or more client computer systems can execute a file system client daemon to communicate with one or more servers. In existing systems, applications communicate with the file system client via the kernel. However, the ensuing context switching may significantly slows down the performance of the applications.

Aspects of the present disclosure address these shortcomings by employing a file system client being executed in the user space, thus eliminating the context switching operations in invoking the file system client. The file system client application programming interface (API) can include a path resolver designed to convert a file or directory path provided by the application into the address of a data structure (e.g., an inode) describing the file system object.

An application can use a symlink that contains a reference to another ("target") file or directory in the form of an absolute or relative path. In certain implementations, the file system client may treat the root part of the symlink as being relative to the mount point of the file system. When the file system client mounts the file system to a particular mount point, the mount point path is recorded for subsequent use by the path resolver. Responsive to receiving a file path from an application, the path resolver replaces the leading slash ("/") of the symlink with the path to the file system mount point. The path resolver then converts the resulting link to the address of a corresponding data structure (e.g., an inode) describing the file system object.

Various aspects of the above referenced methods and systems are described in details herein below by way of examples, rather than by way of limitation.

Figure 1:
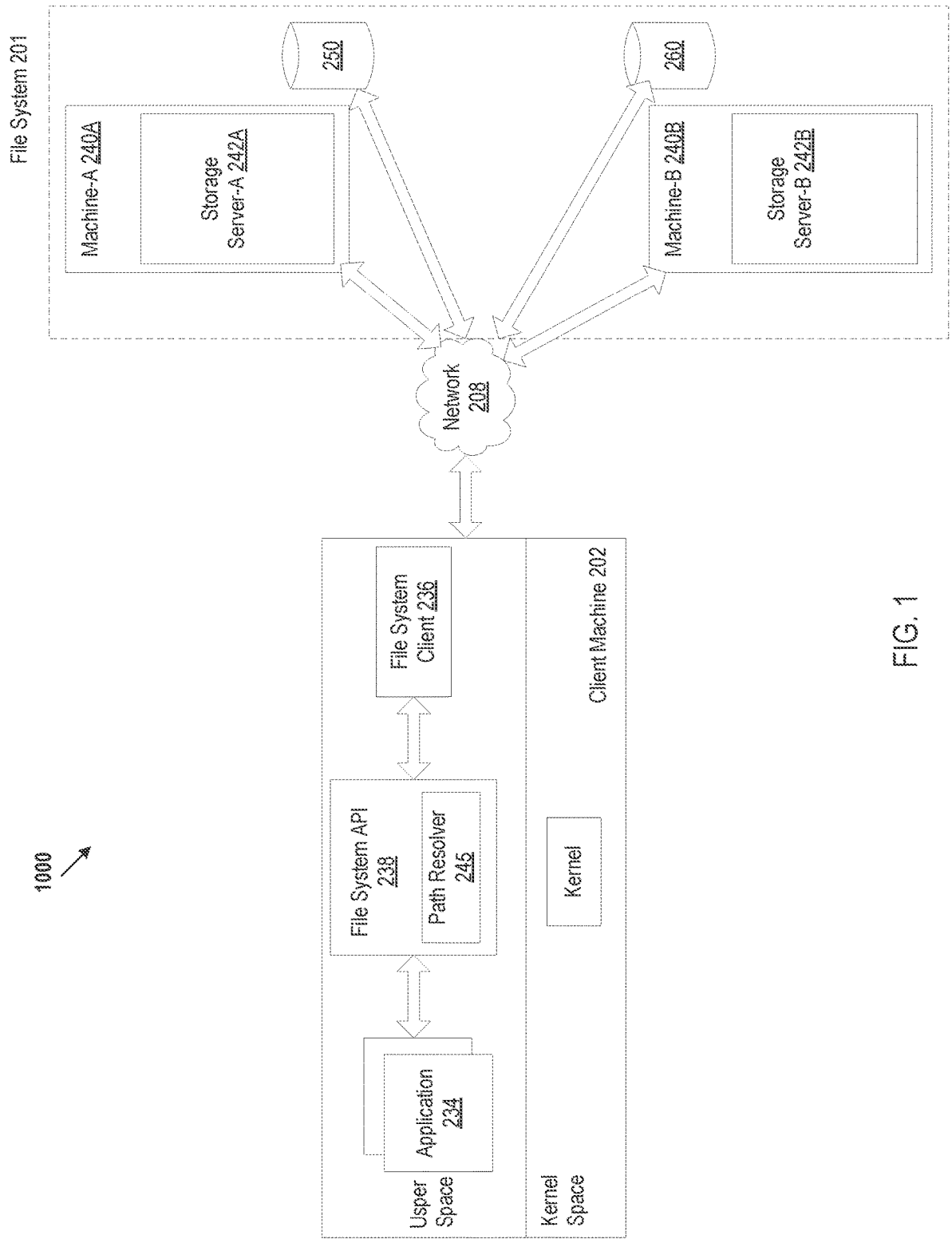
FIG. 1 schematically depicts component diagrams of example computer systems, in accordance with one or more aspects of the present disclosure.

FIG. 1 is an example distributed computer system 1000 for various implementations. The distributed computer system 1000 can include a distributed file system 201 coupled to one or more client machines 202 via a network 208. The network 208 may be a public network, a private network, or a combination thereof. The distributed file system 201 can be a network attached storage file system that includes one or more machines 240A-B and one or more mass storage devices, such as magnetic or optical storage based disks 250,260, solid-state drives (SSDs) or hard drives, coupled to the machines 240A-B via the network 208. The machines 240A-B can include, and are not limited to, any data processing device, such as a desktop computer, a laptop computer, a mainframe computer, a personal digital assistant, a server computer, a handheld device or any other device configured to process data.

The distributed file system 201 can store data as files and can include directories, which are virtual containers within the file system 201, in which groups of files and possibly other directories can be kept and organized. The machines 240A-B can include storage servers 242A-B to manage the files and directories in the data stores 250, 260 for a corresponding storage server 242A-B. The data stores 250, 260 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any collection of items.

One or more client machines 202 can include a file system client 236 to communicate with the storage servers 242A-B in the file system 201. Examples of file system clients 236 can include, and are not limited to, native file system clients and network file system (NFS) clients. "Native" can describe support for specific operating systems. For example, a native file system client may be, and is not limited to, a file system client that supports the Linux operating system. The file system client 236 can mount the file system 201 via a mount point to access the data in the file system 201. The client machines 202 can host one or more applications 234. An application 234 can be any type of application including, for example, a web application, a desktop application, a browser application, etc. An application 234 may request access (e.g., read, write, etc.) to the data in the file system 201 via the file system client 236. The client machine 202 may be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like.

Applications 234 and file system client 236 operate in the user space of client machine's memory. In existing systems, application 234 communicates with the file system client 236 via the kernel. However, this indirect communication significantly slows down the performance of the application 234, especially when such communication pertains to data residing remotely on storage servers 242.

Aspects of the present disclosure address these shortcomings by utilizing a file system API 238, which may be for example a library-based API. In particular, the application 234 can be modified to link to the file system API 238 and make direct function calls to the file system API instead of making calls to the kernel, thereby completely bypassing the kernel and significantly improving performance of the application 234. Examples of the application 234 can include a hardware virtualization program such as a hypervisor (e.g., QEMU), a server message block (SMB) protocol application (e.g., Samba), etc. In some implementations, the file system API 238 can be part of the file system client 236. Alternatively, the file system API 238 can be an independent component.

The file system API 238 can include a path resolver 245 to convert a file or directory path provided by the application 234 into the address of an inode describing the file or directory stored by storage server 242. As opposed to a path resolver in the kernel that operates across different file systems on the client machine 202, the path resolver 245 of the file system API 238 is specific to the file system client 236. The inode can reside on any storage server 242 and can describe a corresponding file/directory located at the same or different storage server 242. The path resolver 245 points to the inode relative to the file system client 236, limiting the inode name space to the file system client 236. In an illustrative example, the path resolver 245 uses a mapping table to map a path to an inode. The mapping table may comprise a plurality of records, each record corresponding to a file system object. Each mapping table record may comprise a file system object path field and a corresponding data structure (e.g., inode) identifier field.

The file metadata comprised by an inode may include the size of the file (in bytes) and its physical location (i.e., the addresses of the blocks of storage containing the file's data on a hard disk), the file owner and group, the file access permissions (i.e., which users are permitted to read, write and/or execute the file), timestamps reflecting the times when the inode was created, last modified and last accessed, and a reference count telling how many hard links point to the inode.

Application 234 can use symlinks to point to different files and directories. A "symbolic link" refers to a special file type whose data comprises a path to another file. The operating system may recognize the data as a path, and hence may forward the file access requests to the file referenced by the symbolic link.

A symlink can be an absolute symlink (e.g., /home/user/data) that provides a full address of the target file, or a relative symlink (e.g., home/project/project1) that points to the target file relative to the position where the symlink is currently placed. Because the scope of the path resolver 245 is limited to a single file system, the path resolver 245 can treat the root part of the symlink as being relative to the root of the file system client 236, where the root of the file system client 236 is the mount point to access data in the file system 201. When the file system client 236 mounts the file system 201 via a mount point, the address of (or a path to) the mount point is recorded for subsequent use by the path resolver 245. When application 234 provides a symlink to the file system API 238, the path resolver 245 replaces the leading forward slash ("/") of the symlink with the file system root (the path to the mount point). In an illustrative example, the path resolver 245 combines the file system root with the rest of the symlink, and converts the resulting link to the address of a corresponding inode using a mapping table.

In an illustrative example, a relative symlink is resolved to the path as if the symlink destination is referred from the directory where the symlink itself is stored. For example, if a relative symlink refers to "A", it means it is referring to a file/dir named "A" in the directory where the symlink is existing. In another example, if a relative symlink refers to " . . . ", it is referring to a directory above the directory where the relative symlink is existing, etc.

In certain implementations, when the application 234 attempts to access data in the distributed file system 201, it uses the file system API 238 and path resolver 245. Otherwise, when the application 234 attempts to access data which is stored in the same machine in direct attached storage, it uses the kernel.

Figure 2:
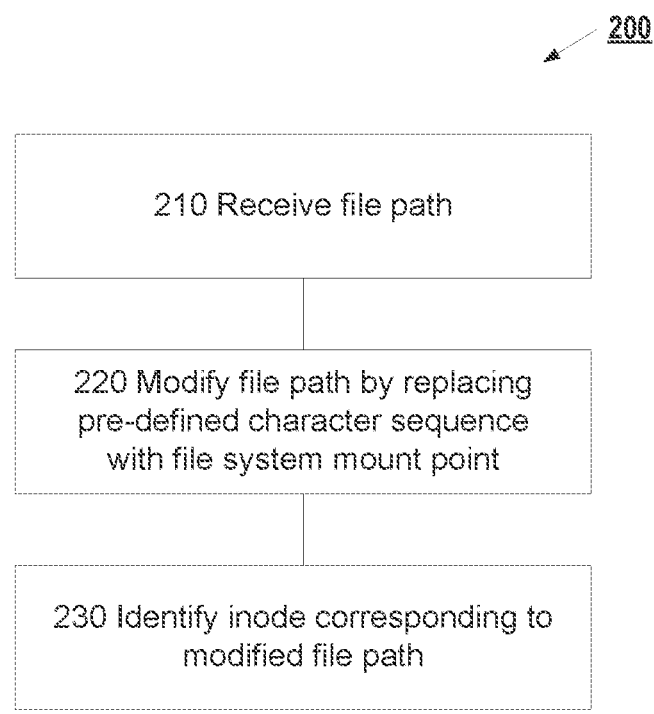
FIG. 2 depicts a flow diagram of an example method implementing a path resolver facilitating client access to a distributed file system, in accordance with one or more aspects of the present disclosure.

FIG. 2 depicts a flow diagram of an example method 200 implementing a path resolver facilitating client access to a distributed file system, in accordance with one or more aspects of the present disclosure. Method 200 and/or each of its individual functions, routines, subroutines, or operations may be performed by one or more processors of the computer system (e.g., a client machine 202) executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other.

At block 210, a file system client being executed in the user space of a computer system may receive a file identifier comprising a symbolic link. In certain implementations, the file identifier may comprise a file path. In an illustrative example, the symbolic link may be provided by an absolute symbolic link, so that the file path would start with a forward slash "/" symbol, as described in more details herein above.

The file system client may then determine whether the file identifier is associated with a file residing locally (e.g., in a directly attached storage of a machine hosting the file system client). If so, the processing may continue, without modifying the file identifier, at block 230. Otherwise, at block 220, the file system client may modify the file identifier by replacing a pre-defined sequence of characters by a path to a mount point of a distributed file system, as described in more details herein above.

At block 230, the file system client may identify, based on the modified file identifier, a data structure comprising information about the file. In an illustrative example, the data structure may be provided by inode. The file system client may look up the modified file identifier in a table mapping file paths to inodes, as described in more details herein above.

Responsive to completing operations described with respect to block 230, the method may terminate.

Figure 3:
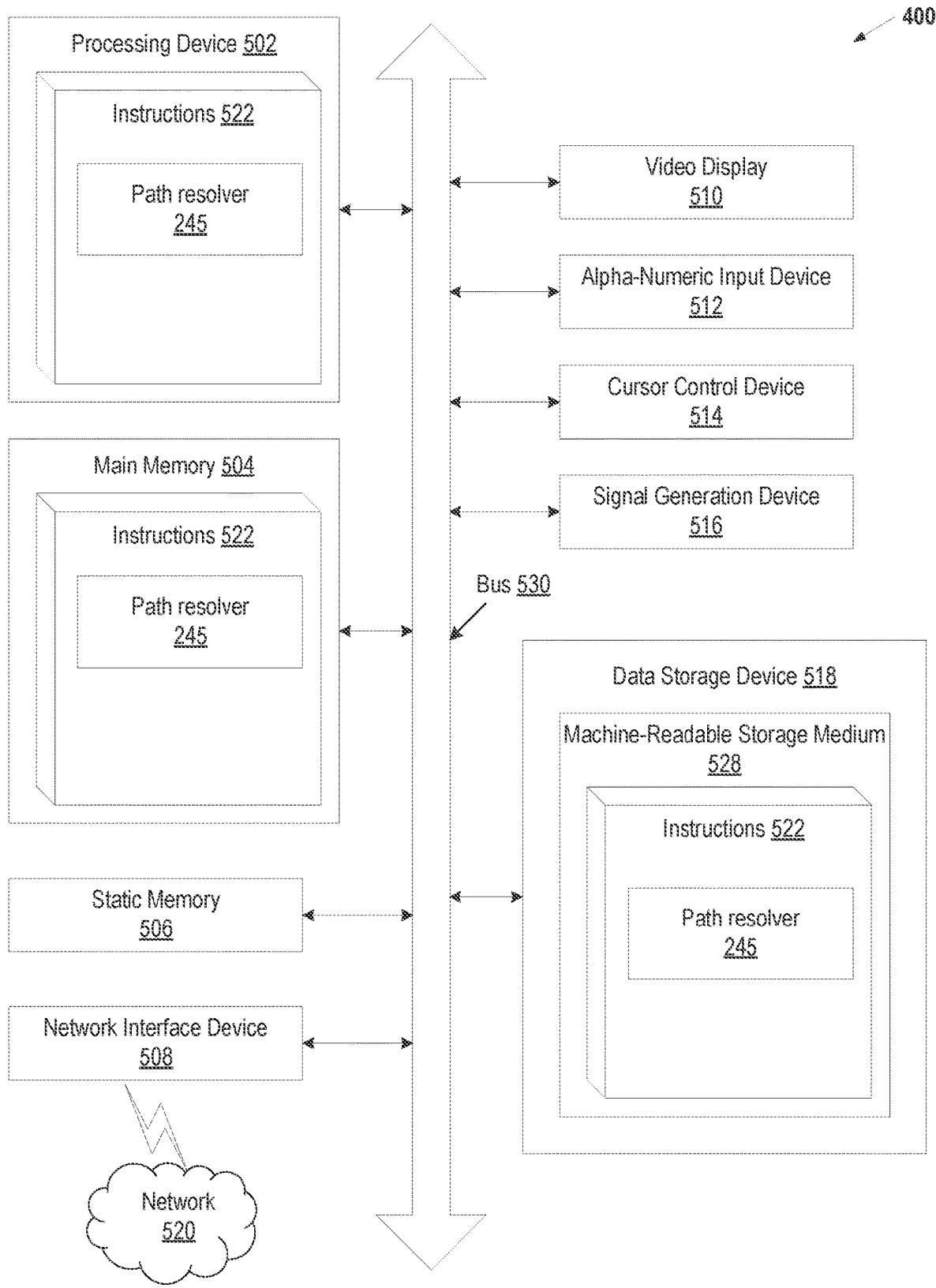
FIG. 3 depicts an illustrative computer system operating in accordance with one or more aspects of the present disclosure.

FIG. 3 illustrates an example machine of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 402 is configured to execute instructions 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-readable storage medium 428 (also known as a computer-readable medium) on which is stored one or more sets of instructions or software 422 embodying any one or more of the methodologies or functions described herein. The instructions 422 may also reside, completely or at least partially, within the main memory 404 and/or within the processing device 402 during execution thereof by the computer system 400, the main memory 404 and the processing device 402 also constituting machine-readable storage media.

In one implementation, the instructions 422 include instructions for the path resolver module 245 of FIG. 1. While the machine-readable storage medium 428 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "locating" or "determining" or "self-healing" or "examining" or "comparing" or "acquiring" or "providing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method, comprising:
    receiving a file identifier from an application by a processing device of a client of a distributed file system via an application programming interface (API) that bypasses kernel calls;
    determining that a file referenced by the file identifier resides on a file server of the distributed file system;
    producing, by a process invoked via the API, a modified file identifier, by replacing a defined sequence of characters within the file identifier by a path to a mount point of the distributed file system;
    identifying, within an index node namespace limited to the client of the distributed file system, an index node associated with the modified file identifier; and
    accessing data referenced by the index node.

2. The method of claim 1, wherein the file identifier comprises a file path.

3. The method of claim 1, wherein the defined sequence of characters comprises a file path delimiter character.

4. The method of claim 1, wherein the file identifier comprises an absolute symbolic link.

5. The method of claim 1, further comprising:
    associating the distributed file system with the mount point; and
    storing the path to the mount point.

6. The method of claim 1, wherein the index node resides on a second file server of the distributed file system.

7. A system, comprising:
    a memory; and
    a processing device, operatively coupled to the memory, to:
        receive, by a client of a distributed file system, a file identifier from an application via an application programming interface (API) that bypasses kernel calls;
        produce, by a user space process invoked via the API, a modified file identifier, by replacing a defined sequence of characters within the file identifier by a path to a mount point of the distributed file system;
        identifying, within an index node namespace limited to the client of the distributed file system, an index node associated with the modified file identifier; and
        access a file referenced by the index node.

8. The system of claim 7, wherein the file identifier comprises a file path.

9. The system of claim 7, wherein the defined sequence of characters comprises a file path delimiter character.

10. The system of claim 7, wherein the file identifier comprises an absolute symbolic link.

11. The system of claim 7, wherein the processing device is further to:
    associate the distributed file system with the mount point; and
    store the path to the mount point.

12. The system of claim 7, wherein the index node resides on a second file server of the distributed file system.

13. A non-transitory computer-readable storage medium comprising executable instructions that, when executed by a processing device, cause the processing device to:
    receive, by a client of a distributed file system, a file identifier from an application via an application programming interface (API) that bypasses kernel calls;
    determine that a file referenced by the file identifier resides on a file server of the distributed file system;
    produce, by a process invoked via the API, a modified file identifier, by replacing a defined sequence of characters within the file identifier by a path to a mount point of the distributed file system;
    identify, within an index node namespace limited to the client of the distributed file system, an index node associated with the modified file identifier; and
    access data referenced by the index node.

14. The non-transitory computer-readable storage medium of claim 13, wherein the file identifier comprises a file path.

15. The non-transitory computer-readable storage medium of claim 13, wherein the defined sequence of characters comprises a file path delimiter character.

16. The non-transitory computer-readable storage medium of claim 13, wherein the file identifier comprises an absolute symbolic link.

17. The non-transitory computer-readable storage medium of claim 13, further comprising executable instructions that, when executed by the processing device, cause the processing device to:
  associate the distributed file system with the mount point; and
  store the path to the mount point.

18. The non-transitory computer-readable storage medium of claim 13, wherein the index node resides on a second file server of the distributed file system.

* * * * *